United States Patent
Pöyhönen et al.

(10) Patent No.: US 7,417,408 B2
(45) Date of Patent: Aug. 26, 2008

(54) METHOD AND ARRANGEMENT FOR CHARGING CAPACITORS OF DIRECT-VOLTAGE INTERMEDIATE CIRCUIT OF FREQUENCY CONVERTER

(75) Inventors: Simo Pöyhönen, Vantaa (FI); Markku Talja, Järvenpää (FI)

(73) Assignee: ABB Oy, Helsinki (FI)

( * ) Notice: Subject to any disclaimer, the term of this patent is extended or adjusted under 35 U.S.C. 154(b) by 275 days.

(21) Appl. No.: 11/446,966

(22) Filed: Jun. 6, 2006

(65) Prior Publication Data
US 2006/0279259 A1 Dec. 14, 2006

(30) Foreign Application Priority Data
Jun. 6, 2005 (FI) .................................. 20055287

(51) Int. Cl.
*H02J 7/00* (2006.01)
(52) U.S. Cl. .................. 320/166; 320/116; 320/119; 320/120; 320/122; 320/167
(58) Field of Classification Search ................ 320/116, 320/119, 120, 122, 166, 167
See application file for complete search history.

(56) References Cited

U.S. PATENT DOCUMENTS

| | | | | |
|---|---|---|---|---|
| 5,461,297 A | * | 10/1995 | Crawford | 320/166 |
| 5,557,187 A | * | 9/1996 | Koch et al. | 320/166 |
| 6,268,710 B1 | * | 7/2001 | Koga | 320/116 |
| 6,664,766 B2 | * | 12/2003 | Desprez et al. | 320/167 |
| 7,271,505 B1 | * | 9/2007 | Miettinen | 307/110 |
| 2003/0214269 A1 | * | 11/2003 | Shiue et al. | 320/166 |
| 2005/0122752 A1 | | 6/2005 | Schnetzka | |

FOREIGN PATENT DOCUMENTS

EP     1 538 733 A2     6/2005

OTHER PUBLICATIONS

Ajith.H. Wijenayaka et al., "Modeling and Analysis of Shared/Common DC Bus Operation of AC Drives" (Part I), IEEE Thirty-second IAS Annual Meeting, IAS, Oct. 5-9, 1997, vol. 1, pp. 599-604.
Michael Tetmeyer et al., "Benefits and Pitfalls of Common-Bussing AC Inverters", IEEE, Textile, Fiber and Film Industry Technical Conference, May 1996, pp. 1-5.
José Rodríguez et al., "Operating Experience of Shovel Drives for Mining Applications", IEEE Transactions on Industry Applications, vol. 40, No. 2, Mar.-May 2004, pp. 664-671.
Finnish Office Action dated Apr. 26, 2006.

* cited by examiner

*Primary Examiner*—Bao Q. Vu
*Assistant Examiner*—Arun Williams
(74) *Attorney, Agent, or Firm*—Buchanan Ingersoll & Rooney PC

(57) ABSTRACT

A method and an arrangement for charging capacitors of a direct-voltage intermediate circuit of a frequency converter. The arrangement comprises a charging circuit (CCA) comprising a first diode (D1) and a second diode (D2) connected in series with the first diode (D1) and a current-limiting component (AA) connected in parallel with the series connection of the diodes (D1, D2), whereby said capacitors may be charged through a main switch (K1b, K2b, ..., Knb) of the capacitor, the first diode (D1) and the current-limiting component (AA).

10 Claims, 2 Drawing Sheets

METHOD AND ARRANGEMENT FOR CHARGING CAPACITORS OF DIRECT-VOLTAGE INTERMEDIATE CIRCUIT OF FREQUENCY CONVERTER

RELATED APPLICATIONS

The present application claims priority under 35 USC § 119 to Finnish Patent Application No. 20055287, filed Jun. 6, 2005, the contents of which are hereby incorporated by reference in their entirety.

BACKGROUND OF THE INVENTION

The invention relates to a method for charging capacitors of a direct-voltage intermediate circuit of a frequency converter.

The invention also relates to an arrangement for charging capacitors of a direct-voltage intermediate circuit of a frequency converter, the arrangement comprising voltage connections to a voltage supply unit of the direct-voltage intermediate circuit, a positive bar and a negative bar of the direct-voltage intermediate circuit, a charging circuit of the direct-voltage intermediate circuit, a switch of the charging circuit and a by-pass switch of the charging circuit, capacitors corresponding to inverter parts connectable to the direct-voltage intermediate circuit, the first pole of the capacitors being connected to a positive bar of the direct-voltage intermediate circuit and the second pole being connectable in connection with a negative bar of the direct-voltage intermediate circuit by means of a charge switch and/or a main switch of the capacitor.

A frequency converter is a device, which is used for generating an adjustable alternating voltage by using a constant-frequency voltage. The most typical application of frequency converters is to control motors in such a manner that alternating voltage of a supplying network is converted into adjustable voltage in order to control the motor. In direct frequency converters, the electricity to be supplied from an alternating current network is chopped by semiconductor switches directly into an alternating current with a desired frequency and voltage. In frequency converters with intermediate circuits, both direct-voltage and direct-current intermediate circuits, the electricity supplied by the alternating current network is first converted into direct current and then back into alternating current.

A frequency converter with a direct-voltage intermediate circuit comprises a rectifier part for rectifying alternating current into direct current, a direct-voltage intermediate circuit and an inverter part for converting direct current back into alternating current. In a direct-voltage intermediate circuit, high-energy capacitors or capacitor batteries are used both as low-impedance energy reserves and for filtering the direct voltage and direct current and thus for smoothing the direct-voltage ripple. There is a separate capacitor or capacitor battery for each inverter part in the intermediate circuit. In addition to the capacitor, the direct-voltage intermediate circuit may also comprise a smoothing inductor between the rectifier part and the capacitor.

When a dead high-capacitance capacitor is connected via a low impedance to a voltage source serving as a supply unit for the direct-voltage intermediate circuit, a power surge occurs, which may cause that protective devices, such as fuses, start to function. To prevent this, the power surge must be limited to a level suitable for protective devices. If a fully-controlled or semi-controlled diode bridge serves as a supply unit for the direct-voltage intermediate circuit, the direct voltage of the intermediate circuit may be increased during the starting in a ramp-like manner by changing the current delay angle of thyristors belonging to the supply unit. If the supply unit only consists of diodes, a diode bridge or a unit which is started at first as a pure diode bridge, e.g. a network inverter, a specific charging circuit must be used in the supply unit for limiting the charging current. A charging circuit limiting the charging current may include, for instance, resistors or a direct-current chopper. After the charging, the charging circuit is typically bypassed, since too great power losses would be generated in the charging circuit if power was supplied through it in a normal operating situation.

In big factories, inverter parts are typically connected to line drives, whereby one line drive may comprise dozens of inverter parts connected to the same DC busbar system. Some of these inverter parts may be connected to the DC busbar system during the starting and some not, e.g. because of maintenance of a motor connected to the inverter part. In this case, however, it must be possible to connect each inverter part to the live DC busbar system without disturbing the other inverter parts.

Conventionally this is implemented by a plurality of separate charging circuits, whereby during the starting of the supply unit, a separate charging circuit reserved for the supply unit and a separate charging circuit for each inverter part are used. Each inverter part thus requires its own charging circuit. A problem with this solution is that in large line drives, wherein there is a separate charging circuit for each inverter part and a direct-current chopper serves as a charging circuit, the costs of the system rise considerably because of a great number of direct-current choppers. Instead of direct-current choppers, resistors may be used as components limiting the current of the charging circuit but, in this case, the sizing of the resistors, both in each individual charging circuit and in the entire system, is very difficult.

BRIEF DESCRIPTION OF THE INVENTION

It is an object of the present invention to provide a novel method and arrangement for charging capacitors of a direct-voltage intermediate circuit of a frequency converter.

e method of the invention is characterized in that the direct-voltage intermediate circuit comprises voltage connections to a voltage supply unit, a charging circuit of the direct-voltage intermediate circuit, comprising a first diode and a second diode connected in series with the first diode and a current-limiting component connected in parallel with the series connection of the diodes, a positive bar and a negative bar of the direct-voltage intermediate circuit, the negative bar being arranged to be divided into a first branch and a second branch between said diodes in such a manner that the cathode of the first diode is connected to the second branch of the negative bar and the anode to the cathode of the second diode and that the anode of the second diode is connected to the negative bar and that the first pole of the current-limiting component is connected in connection with the cathode of the first diode and the second pole in connection with the anode of the second diode, a switch of the charging circuit and a by-pass switch of the charging circuit, the switch of the charging circuit being arranged in the negative bar of the charging circuit between a negative voltage connection and the charging circuit and the first pole of the by-pass switch of the charging circuit being arranged to be connected to the negative bar between a charge switch of the charging circuit and the negative voltage connection and the second pole of the by-pass switch of the charging circuit being arranged to be connected to the first branch of the negative bar between the charging circuit and the main switches of the capacitors, and capacitors corresponding to inverter parts connectable to the direct-voltage intermediate circuit, the first pole of the capacitors being connected to the positive bar of the direct-voltage intermediate circuit and the second pole being connectable to the first branch of the negative bar by the main switch of the capacitor and to the second branch of the negative bar by the charge switch of the capacitor, the method comprising, during the starting of the direct-voltage intermediate circuit, starting the voltage supply unit, connecting the direct-voltage intermediate circuit to the voltage supply unit, connecting the charging circuit to the voltage supply unit by switching the switch of the charging circuit to a closed position and connecting the capacitors to be charged to the first branch of the negative bar by switching on the main switches of the capacitors to be charged, whereby said capacitors are charged by means of the main switch of the capacitor, the first diode and the current-limiting component.

The arrangement of the invention is characterized in that the charging circuit comprises a first diode and a second diode connected in series with the first diode and a current-limiting component connected in parallel with the series connection of the diodes, and that the negative bar is arranged to be divided into a first branch and a second branch between said diodes in such a manner that the cathode of the first diode is connected to the second branch of the negative bar and the anode to the cathode of the second diode and that the anode of the second diode is connected to the negative bar and that the first pole of the current-limiting component is connected in connection with the cathode of the first diode and the second pole in connection with the anode of the second diode, and that the switch of the charging circuit is arranged in the negative bar of the charging circuit between a negative connection and the charging circuit, and that the first pole of the by-pass switch of the charging circuit is arranged to be connected to the negative bar between the charge switch of the charging circuit and the negative connection and that the second pole of the by-pass switch of the charging circuit is arranged to be connected to the first branch of the negative bar between the charging circuit and the main switches of the capacitors, and that the charge switch of the capacitor is arranged to connect the second pole of the capacitor to the second branch of the negative bar and that the main switch of the capacitor is arranged to connect the second pole of the capacitor to the first branch of the negative bar.

The invention is based on a charging circuit comprising a first diode and a second diode connected in series with the first diode and a current-limiting component connected in parallel with the series connection of these diodes.

Due to the method and arrangement of the invention, one single charging circuit is needed for charging both capacitors connected to the direct-voltage intermediate circuit already during the starting of the direct-voltage intermediate circuit and the voltage supply unit and capacitors of individual inverter parts, as they are connected to the live direct-voltage intermediate circuit later.

BRIEF DESCRIPTION OF THE DRAWINGS

Embodiments of the invention are explained in greater detail in the accompanying drawings, in which FIG. 1 schematically shows a basic structure of a frequency converter in a very general level, FIG. 2 schematically shows a prior art solution for charging capacitors of a direct-voltage intermediate circuit, and FIG. 3 schematically shows a solution according to the invention for charging capacitors of a direct-voltage intermediate circuit.

For the sake of clarity, the invention is simplified in the figures. Like parts are denoted by the same reference numerals in the figures.

DETAILED DESCRIPTION OF EMBODIMENTS OF THE INVENTION

Figure 1:
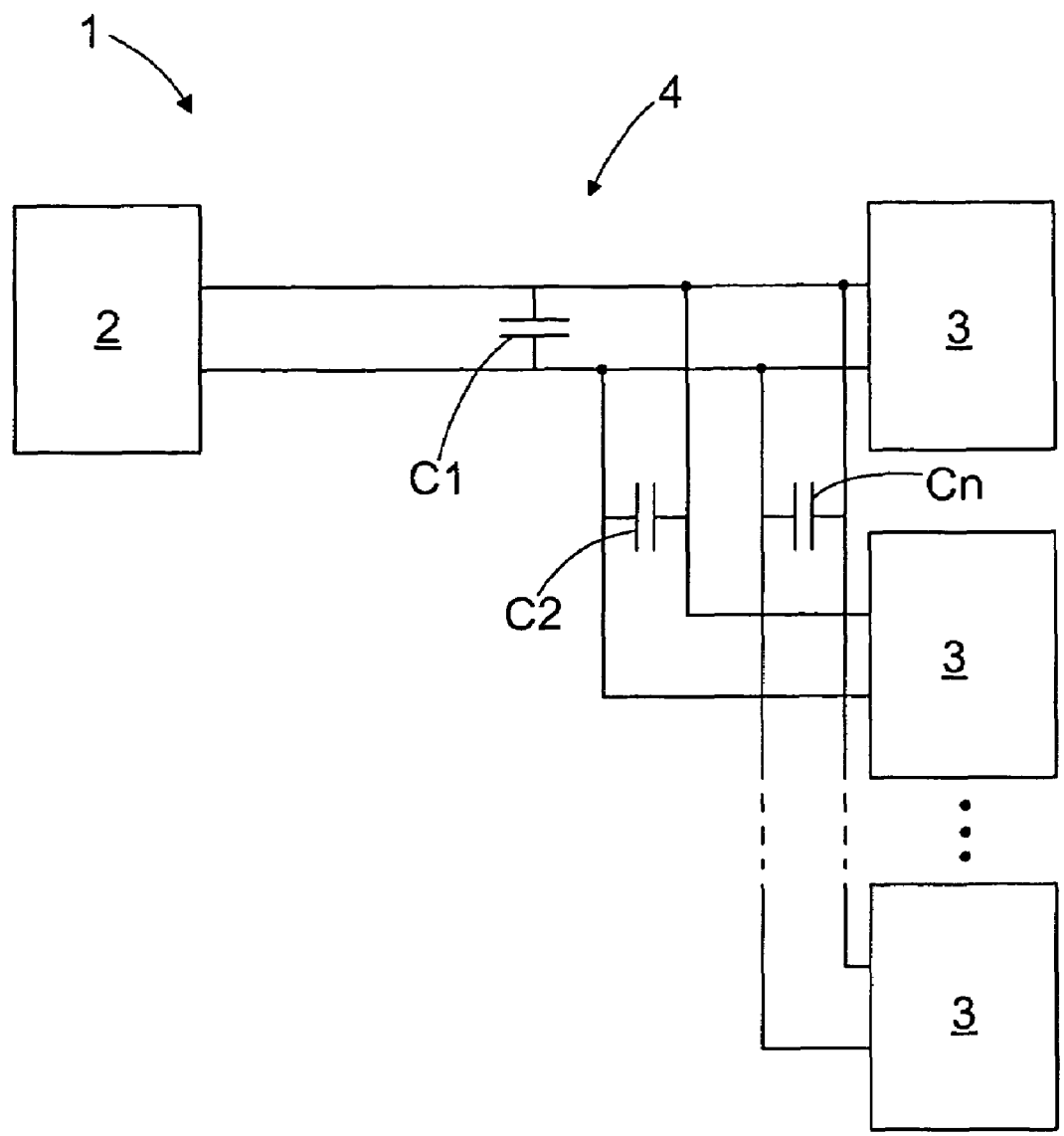

FIG. 1 schematically shows a basic structure of a frequency converter in a very general level. A frequency converter 1 shown in FIG. 1 comprises a rectifier part 2 for rectifying alternating current into direct current, and n inverter parts 3 for converting direct current back into alternating current. Between the rectifier part 2 and the inverter parts 3 there is a direct-voltage intermediate circuit comprising capacitors C1, C2, . . . Cn, or capacitor batteries, which are intended to serve as a low-impedance energy reserve and to filter direct voltage and direct current and thus to smooth the direct-voltage ripple. For each inverter part 3 there is a separate capacitor. The basic structure and function of a frequency converter and different implementation alternatives thereof are known per se to a person skilled in the art, and they are not further explained in this context.

Figure 2:
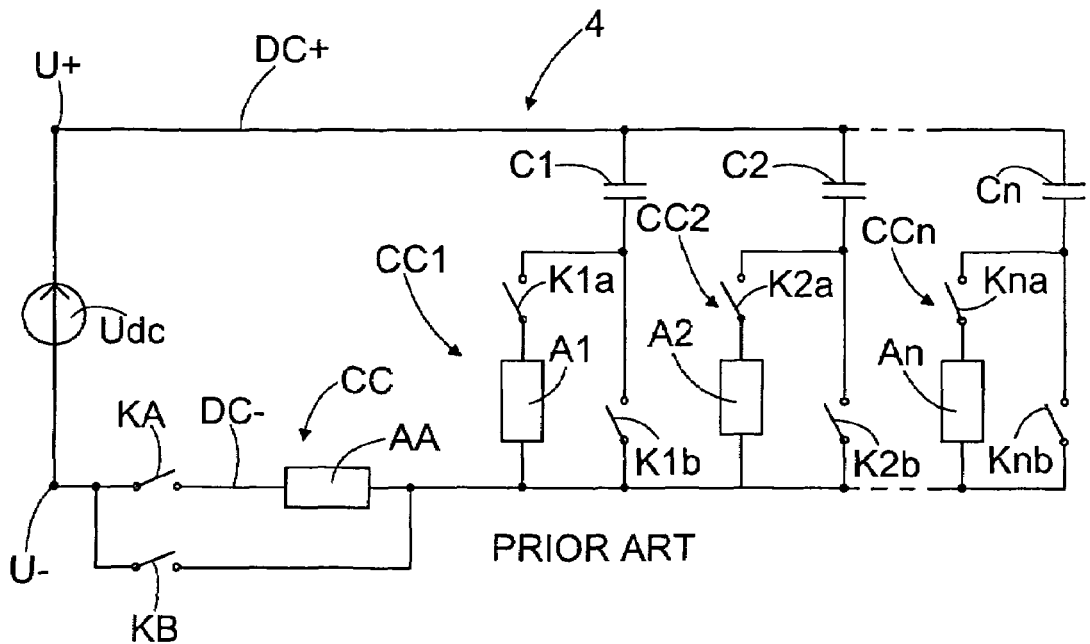

FIG. 2 shows a principle of a connection of a prior art solution for charging capacitors C1, C2, . . . , Cn of a direct-voltage intermediate circuit schematically. For the sake of clarity, the arrangement of FIG. 2 does not show the actual inverter parts 3, and so FIG. 2 only shows a capacitor corresponding to each inverter part 3. In the solution according to FIG. 2, each inverter part has its own charging circuit, and when the supply unit is started, the supply unit's own charging circuit is used, and when each inverter part is started, the charging circuit of each inverter part is used.

In FIG. 2, Udc is a direct-voltage source, which may be, for instance, the afore-mentioned rectifier part 2 and which serves as a voltage supply unit for the direct-voltage intermediate circuit. The direct-voltage source is connected to a positive voltage connection U+ and a negative voltage connection U− of the intermediate circuit, a positive bar DC+ and a negative bar DC−, respectively, extending therefrom. The first pole of the capacitor C1, C2, . . . , Cn corresponding to each inverter part is connected to the positive bar DC+, and the second pole is connected to a charging circuit CC1, CC2, . . . , CCn of the capacitor corresponding to each inverter part. The charging circuit of each capacitor comprises a charge switch K1a, K2a, . . . , Kna of the charging circuit and a component A1, A2, . . . , An limiting the current of the charging circuit of the capacitor connected in series with the switch. The second pole of each capacitor is also connected to a main switch K1b, K2b, . . . , Knb of the capacitor connected in parallel with said series connection. The second pole of each capacitor is thus connectable to the negative bar DC− either via the charging circuit or a by-pass switch of the charging circuit.

The solution according to FIG. 2 further comprises a supply charging circuit CC, which is placed in the negative bar between the negative voltage connection U− and the charging circuits of the inverter parts. The supply charging circuit CC comprises a switch KA of the charging circuit and a component AA limiting the current of the charging circuit and connected in series with the switch. Connected in parallel with this series connection, there is a by-pass switch KB of the charging circuit, by which the charging circuit CC can be bypassed. In both the supply charging circuit and the charging circuit of each inverter part, said component limiting the charging current may comprise one or more resistors or direct-current choppers, the general operating principle and structure of which is known per se to a person skilled in the art.

The solution of FIG. 2 functions in the following manner. In the initial state, a capacitor corresponding to an inverter part, in FIG. 2 the capacitor C1, is connected to the busbar system by means of a closed switch K1b (in FIG. 2, the switch K1b is shown opened). In addition to the capacitor C1, the direct-voltage intermediate circuit may naturally also comprise other continuously connected capacitance. When the voltage supply unit Udc is started, the switch KA of the supply charging circuit is switched on, and the charging of the capacitor C1 begins through the current-limiting component AA. After the voltage of the capacitor C1 has reached the predetermined sufficient value, the switch KB is switched on and the switch KA is switched off. When capacitors C2, ..., Cn corresponding to other inverter parts are later connected to the live intermediate circuit, the switch Kxa of the charging circuit, corresponding to the capacitor Cx, of the connectable inverter part is switched on first, whereupon the capacitor Cx is charged through the current-limiting component Ax. After the voltage of the capacitor Cx has reached the predetermined sufficient value, the main switch Kxb of the corresponding capacitor is switched on.

The solution shown in FIG. 2 functions as such but in large line drives, wherein dozens of inverter parts may be connected to the same busbar system, the costs of the system are high because of a great number of charging circuits especially when a direct-current chopper is used as a current-limiting component.

Figure 3:
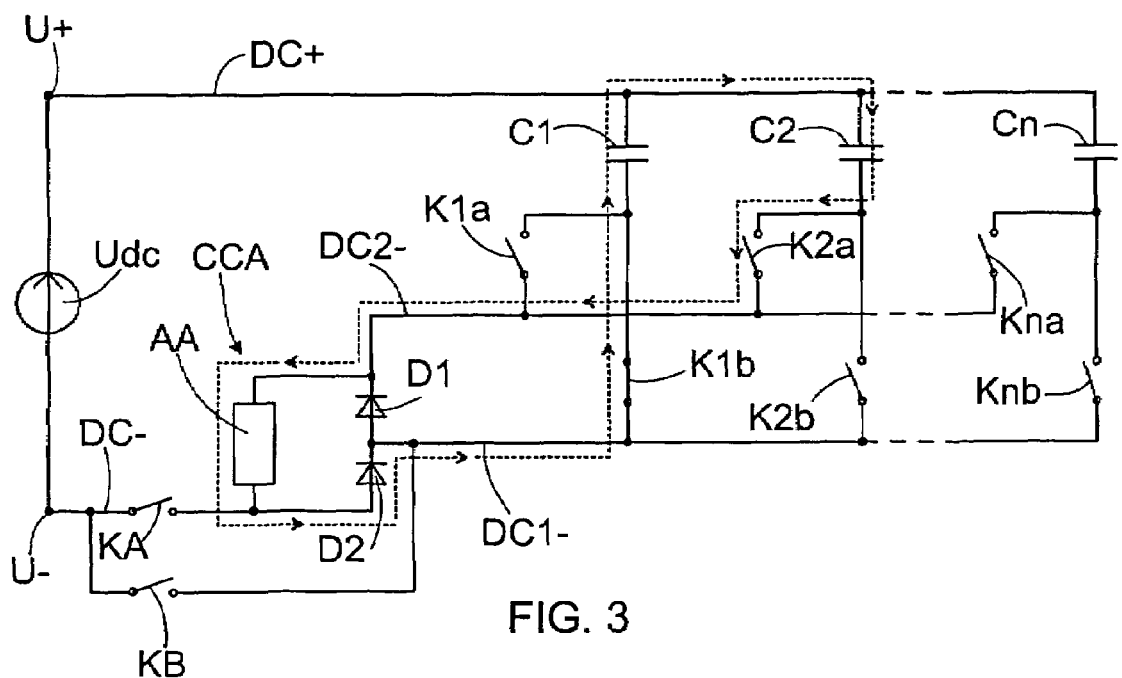

FIG. 3 schematically shows a principle of a connection according to a solution of the invention for charging capacitors C1, C2, ..., Cn of a direct-voltage intermediate circuit. For the sake of clarity, the arrangement of FIG. 3 does not show the actual inverter parts, and so FIG. 3 only shows a capacitor corresponding to each inverter part 3. In the solution according to FIG. 3 there is only one charging circuit CCA, and when the supply unit is started and each inverter part is used, one and the same charging circuit CCA is employed.

The solution according to FIG. 3 thus comprises the charging circuit CCA, which is placed in the negative bar DC− between the voltage connection U− and the capacitors C1, C2, ..., Cn of the inverter parts. The charging circuit CCA comprises a parallel connection between the current-limiting component M and two diodes, the first diode D1 and the second diode D2, connected in series. Between the diodes D1 and D2 the negative bar DC− is divided into two branches, the first branch DC1− and the second branch DC2−, in such a manner that the cathode of the first diode D1 is connected to the second branch of the negative bar and the anode, for its part, is connected to the cathode of the second diode D2. The anode of the second diode D2 is connected to the negative bar DC−. The first pole of the current-limiting element AA is connected to the second branch DC2− of the negative bar in such a manner that it is in connection with the cathode of the first diode D1 and the second pole is connected to the negative bar DC− in such a manner that it is in connection with the anode of the second diode D2.

Between the voltage connection U− and the charging circuit CCA there is the switch KA of the charging circuit, by which the charging circuit may be connected to the voltage supply unit Udc. The arrangement also comprises the by-pass switch KB of the charging circuit, the first pole of which is arranged to be connected to the negative bar DC− between the charge switch KA of the charging circuit and the voltage connection U− and the second pole of which by-pass switch KB is arranged to be connected to the first branch DC1− of the negative bar between the charging circuit CCA and the main switches K1b, K2b, ..., Knb of the capacitors.

The first pole of the capacitor C1, C2, ..., Cn corresponding to each inverter part is connected to the positive bar DC+. The second pole of each capacitor is connectable through the charge switch K1a, K2a, ..., Kna to the second branch DC2− of the negative bar or through the main switch K1b, K2b, ..., Knb of the capacitor to the first branch DC1− of the negative bar.

The solution of FIG. 3 functions in the following manner. In the initial state of FIG. 3, a capacitor corresponding to an inverter part, in FIG. 3 the capacitor C1, is connected to the busbar system by means of a closed switch K1b. In addition to the capacitor C1, the direct-voltage intermediate circuit may naturally also comprise other continuously connected capacitance. When the voltage supply unit is started, the charge switch KA of the charging circuit is switched on, and the charging of the capacitor C1 begins through the switch K1b, the diode D1 and the current-limiting component AA. After the voltage of the capacitor C1 has reached the predetermined sufficient value, the by-pass switch KB of the charging circuit is switched on, after which the charge switch KA of the charging circuit is switched off. When capacitors C2, ..., Cn corresponding to other inverter parts are later connected to the live intermediate circuit, the charge switch Kxa corresponding to the capacitor Cx to be connected, i.e. charged, is switched on first, whereupon the capacitor is charged through the current-limiting component Ax and the diode D2. In FIG. 3, a broken line illustrates the flow of charging current in a situation where the switch K2a is assumed to be closed. After the voltage of the capacitor Cx has reached the predetermined sufficient value, the switch Kxb is switched on.

In the embodiment of FIG. 3, the diodes D1 and D2 are used as components limiting the flow direction of current of the charging circuit CCA, the components having a non-conducting direction preventing the flow of current and a conducting direction allowing the flow of current, but other components with the same property of limiting the flow direction of current may also be used as said components.

In the embodiment of FIG. 3, one or more resistors may be used as a current-limiting component AA, but a direct-current chopper may preferably be used as a current-limiting component. In the example shown in FIG. 3, when the direct-voltage intermediate circuit and the voltage supply unit are started, only one capacitor, in this example the capacitor C1, is charged first but during the starting of the direct-voltage intermediate circuit and the voltage supply unit, a plurality of capacitors may naturally be charged at the same time.

Due to the new charging arrangement, one single charging circuit may be used for charging both the capacitors connected to the direct-voltage intermediate circuit during the starting of the direct-voltage intermediate circuit and its voltage supply unit and the capacitors of individual inverter parts when they are later connected to the live direct-voltage intermediate circuit. This is advantageous in large line drives, which may include several dozens of inverter parts connectable to the same DC busbar system.

In the solution of the invention, the entire busbar system is thus charged first, after which power charged into the entire busbar system is taken back via the current-limiting component AA in order to charge capacitors which are to be connected to the busbar system later.

In some cases, the features described in the present application may be applied as such, in spite of other features. On the other hand, the features of the present application may, if necessary, be formed into different combinations.

The drawings and the related description are only intended to illustrate the idea of the invention. In its details, the invention may vary within the scope of the claims.

The invention claimed is:

1. A method for charging capacitors of a direct-voltage intermediate circuit of a frequency converter, the direct-voltage intermediate circuit comprising voltage connections to a voltage supply unit, a charging circuit of the direct-voltage intermediate circuit, comprising a first diode and a second diode connected in series with the first diode and a current-limiting component connected in parallel with the series connection of the diodes, a positive bar and a negative bar of the direct-voltage intermediate circuit, the negative bar being arranged to be divided into a first branch and a second branch between said diodes in such a manner that the cathode of the first diode is connected to the second branch of the negative bar and the anode to the cathode of the second diode and that the anode of the second diode is connected to the negative bar and that the first pole of the current-limiting component is connected in connection with the cathode of the first diode and the second pole in connection with the anode of the second diode, a switch of the charging circuit and a by-pass switch of the charging circuit, the switch of the charging circuit being arranged in the negative bar of the charging circuit between a negative voltage connection and the charging circuit and the first pole of the by-pass switch of the charging circuit being arranged to be connected to the negative bar between the switch of the charging circuit and the negative voltage connection and the second pole of the by-pass switch of the charging circuit being arranged to be connected to the first branch of the negative bar between the charging circuit and the main switches of the capacitors, and capacitors corresponding to inverter parts connectable to the direct-voltage intermediate circuit, the first pole of the capacitors being connected to the positive bar of the direct-voltage intermediate circuit and the second pole being connectable to the first branch of the negative bar by the main switch of the capacitor and to the second branch of the negative bar by the charge switch of the capacitor, the method comprising, during the starting of the direct-voltage intermediate circuit, starting the voltage supply unit, connecting the direct-voltage intermediate circuit to the voltage supply unit, connecting the charging circuit to the voltage supply unit by switching the switch of the charging circuit to a closed position and connecting the capacitors to be charged to the first branch of the negative bar by switching on the main switches of the capacitors to be charged, whereby said capacitors are charged through the main switch of the capacitor, the first diode and the current-limiting component.

2. A method as claimed in claim 1, wherein, after the voltage of the capacitors to be charged reaches a predetermined value, the by-pass switch of the charging circuit is switched to a closed position and the switch of the charging circuit to an open position.

3. A method as claimed in claim 2, wherein, when the capacitor to be charged is connected to the live direct-voltage intermediate circuit, the charge switch of the capacitor is switched on, whereby the capacitor is charged through the current-limiting component and the second diode.

4. A method as claimed in claim 3, wherein, after the voltage of the capacitor to be charged reaches the predetermined value, the main switch of the capacitor is switched on.

5. An arrangement for charging capacitors of a direct-voltage intermediate circuit of a frequency converter, the arrangement comprising voltage connections to a voltage supply unit of the direct-voltage intermediate circuit, a positive bar and a negative bar of the direct-voltage intermediate circuit, a charging circuit of the direct-voltage intermediate circuit, a switch of the charging circuit and a by-pass switch of the charging circuit, capacitors corresponding to inverter parts connectable to the direct-voltage intermediate circuit, the first pole of the capacitors being connected to a positive bar of the direct-voltage intermediate circuit and the second pole being connectable in connection with a negative bar of the direct-voltage intermediate circuit by means of a charge switch and/or a main switch of the capacitor, wherein the charging circuit comprises a first diode and a second diode connected in series with the first diode and a current-limiting component connected in parallel with the series connection of the diodes, the negative bar is arranged to be divided into a first branch and a second branch between said diodes in such a manner that the cathode of the first diode is connected to the second branch of the negative bar and the anode to the cathode of the second diode and that the anode of the second diode is connected to the negative bar and that the first pole of the current-limiting component is connected in connection with the cathode of the first diode and the second pole in connection with the anode of the second diode, the switch of the charging circuit is arranged in the negative bar of the charging circuit between a negative connection and the charging circuit, the first pole of the by-pass switch of the charging circuit is arranged to be connected to the negative bar between the charge switch of the charging circuit and the negative connection and that the second pole of the by-pass switch of the charging circuit is arranged to be connected to the first branch of the negative bar between the charging circuit and the main switches of the capacitors, and the charge switch of the capacitor is arranged to connect the second pole of the capacitor to the second branch of the negative bar and that the main switch of the capacitor is arranged to connect the second pole of the capacitor to the first branch of the negative bar.

6. An arrangement as claimed in claim 5, wherein, when the direct-voltage intermediate circuit is started, the voltage connections of the direct-voltage intermediate circuit are arranged to be connected to the voltage supply unit, the switch of the charging circuit is arranged to connect the charging circuit to the voltage supply unit by closing the switch of the charging circuit, and the main switches of the capacitors to be charged are arranged to connect said capacitors to the first branch of the negative bar by closing the main switches, whereby said capacitors are arranged to be charged through the main switch of the capacitor, the first diode and the current-limiting component.

7. An arrangement as claimed in claim 6, wherein, after the voltage of the capacitors to be charged reaches a predetermined value, the by-pass switch of the charging circuit is arranged to be switched on and the switch of the charging circuit is arranged to be switched off.

8. An arrangement as claimed in claim 7, wherein, when the capacitor to be charged is connected to the live direct-voltage intermediate circuit, the charge switch of the capacitor is arranged to be switched on, whereby the capacitor is arranged to be charged through the current-limiting component and the second diode.

9. An arrangement as claimed in claim 8, wherein, after the voltage of the capacitor to be charged reaches the predetermined value, the main switch of the capacitor is arranged to be switched on.

10. An arrangement as claimed in claim 5, wherein the current-limiting component of the charging circuit is a direct-current chopper.

\* \* \* \* \*